Sept. 30, 1969  A. W. D. HUDGELL  3,469,279
SPINNERET FOR HETEROFILAMENTS
Filed Oct. 15, 1964  3 Sheets-Sheet 3
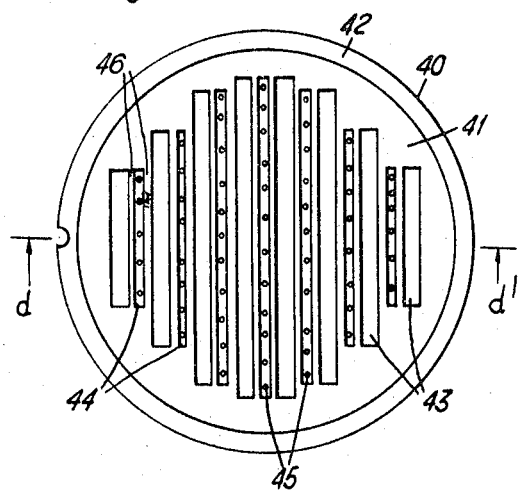
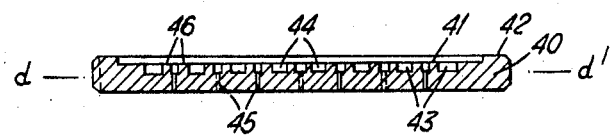
Inventor
ALFRED WILLIAM DAVID HUDGELL United States Patent Office 3,469,279
Patented Sept. 30, 1969

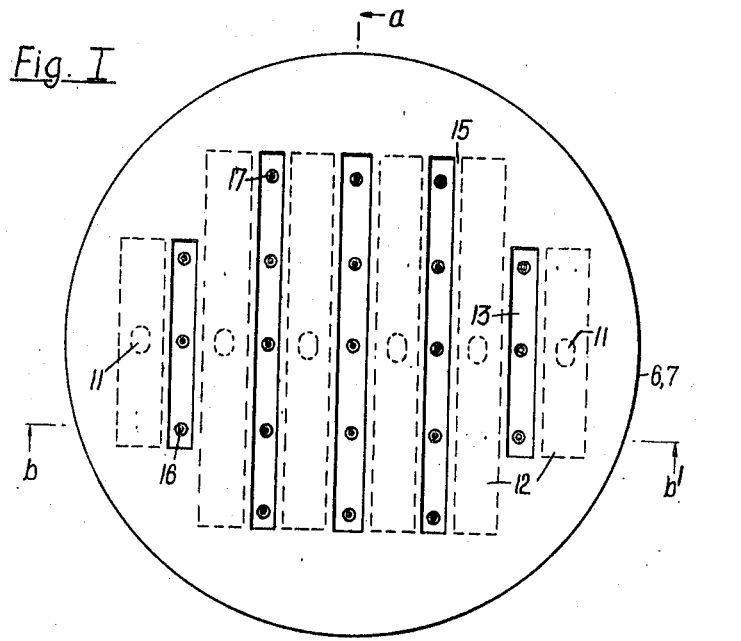
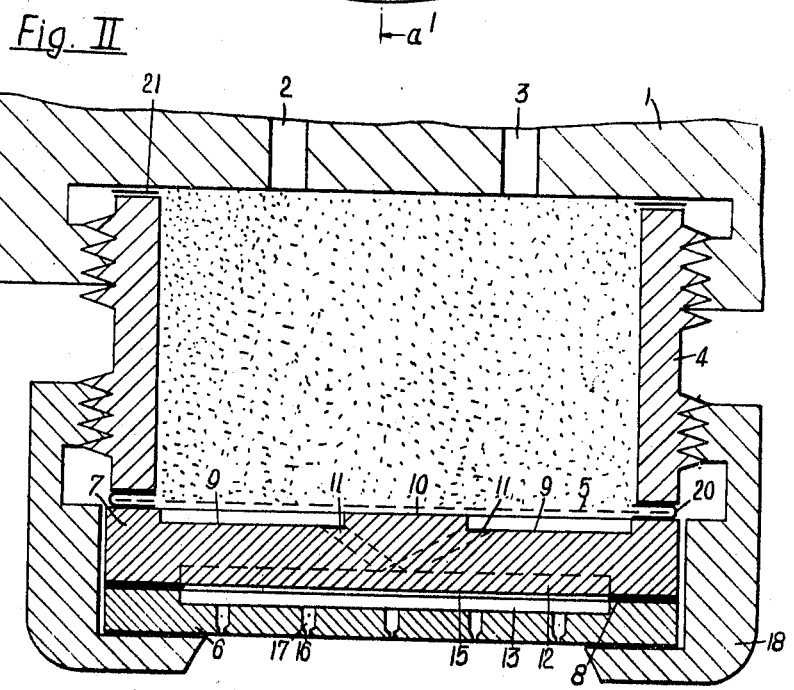

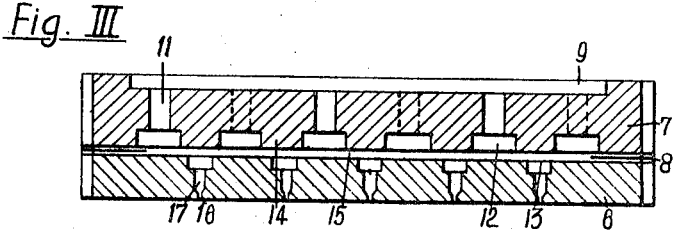
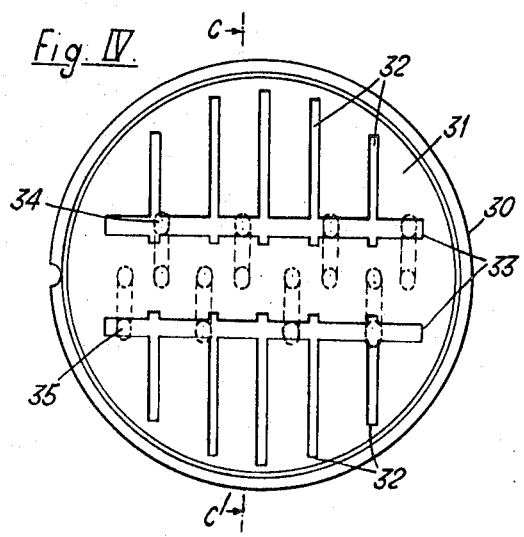
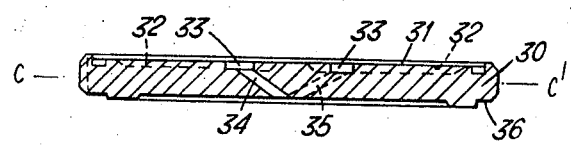

3,469,279
SPINNERET FOR HETEROFILAMENTS
Alfred William David Hudgell, Abergavenny, England, assignor to British Nylon Spinners Limited, Pontypool, Monmouthshire, England
Filed Oct. 15, 1964, Ser. No. 404,017
Claims priority application Great Britain, Oct. 19, 1963, 41,382/63
Int. Cl. D01d 5/18
U.S. Cl. 18—8                                         7 Claims

ABSTRACT OF THE DISCLOSURE

A spinneret assembly for the manufacture of uniform side-by-side heterofilaments comprises a spinneret plate having a plurality of extrusion orifices and a polymer distribution plate parallel to and spaced closely adjacent the spinneret plate. The different polymers flow through separate ports in the distribution plate and are directed across the upstream face of the spinneret plate by special contours of the adjacent faces of the two plates in such a manner that a straight-line interface between the two streams is effected and maintained before the two streams are extruded as heterofilaments.

---

This invention relates to improvements in the manufacture of heterofilaments from synthetic fibre forming polymers.

In the manufacture of heterofilaments, particularly heterofilaments in which the components exist in a side-by-side relationship, great difficulty is experienced in spinning uniform filaments. In particular there is a marked tendency for the composition of heterofilaments, with respect to the component portions, to vary between different filaments in a multifilament yarn and even along the length of a single filament. In a two component heterofilament this variation is frequently caused by the instability of the interface formed by the two liquid polymer components, or solutions of the polymer components above the spinneret orifice through which the components are to be extruded in the form of a heterofilament.

We have now found that the instability of the interface and the uniformity of the heterofilaments particularly with respect to composition, can be vastly improved by metering the flow of the molten polymer components or solutions of the polymer components through a restricted region in the area adjacent to the spinneret orifices and thence into a relatively unconstricted zone in the bottom of which are located the spinneret orifices.

Accordingly therefore the present invention provides a process for the manufacture of heterofilaments formed by the simultaneous extrusion of two viscous liquid melts or solutions of different polymer components through the same extrusion orifice in a side-by-side arrangement wherein the polymer components are caused to flow in opposite directions across portions of the surface of a spinneret plate from relatively unconstricted zones through constricted zones and thence into common relatively unconstricted zones in which the polymer components meet to form a liquid interface and are simultaneously extruded in a side-by-side arrangement through extrusion orifices located in the second mentioned relatively unconstricted zones.

The invention also includes a spinneret assembly which may be employed in the above process. The spinneret assembly comprises a distributor plate and a spinneret plate containing a plurality of extrusion orifices adapted to provide a space between the lower face of the distributor plate and the upper face of the spinneret plate, means in the distributor plate for directing viscous liquid melts or solutions of two different polymer components into alternate relatively unconstricted zones located on either side of other relatively unconstricted zones said relatively unconstricted zones being separated by constricted zones, the extrusion orifices contained in the spinneret plate cooperating with the second mentioned relatively unconstricted zones. Preferably the relatively unconstricted zones are formed by two series of parallel channels, one series of channels being formed above the lines of spinneret orifices to provide relatively unconstricted zones in these areas and the second series being formed between the rows of spinneret orifices to provide a second series of relatively unconstricted zones, there being constricted zones between the two series of relatively unconstricted zones. The second mentioned series of channels are provided with polymer inlet ports which are adapted to feed different polymers from opposite sides of the upper face of the distributor plate into alternate channels.

The two series of channels may be formed entirely in the distributor plate or in the spinneret plate, or the series above the extrusion orifices may be formed in the spinneret plate, and the second series into which the polymer inlet ports feed the polymer components may be formed in the distributor plate. Alternatively the channels could be formed, for example, in a separate plate which would also act as a spacer plate, provided that the dimensions of the constricted zones are retained.

The heightwise dimension of the constricted zones is critical and, for example, should not be greater than 0.003 inch for polymers having a melt viscosity of 300 to 500 poises being spun through extrusion orifices of about 0.015″ diameter.

The invention will now be more fully described with reference to the accompanying drawings, which description is by way of illustration only and is not intended to be limitative of the invention.

In the drawings:

FIGURE I is a diagrammatic plan view of the spinneret assembly showing one particular arrangement of spinneret orifices and channels. The channels in the spinneret plate are shown enclosed by solid lines and those in the underside of the distributor plate by broken lines.

FIGURE II is a cross section of a spinneret and filter pack assembly taken along the line a–a′ of FIGURE I.

FIGURE III is a cross-section of a spinneret and distribution plate assembly taken along the line b–b′ of FIGURE I.

FIGURE IV is the top plan view of another distributor plate according to the invention.

FIGURE V is a cross-section of the distributor plate taken along the line c–c′ of FIGURE IV.

FIGURE VI is a top plan view of a spinneret for use with the distributor plate of FIGURES IV and V.

FIGURE VII is a cross-section of the spinneret of FIGURE VII taken along the line d–d′.

Referring to FIGURES I, II and III of the drawings: A spinning unit, shown in FIGURE II, comprises a cover 1, containing polymer ducts 2 and 3, in screw-threading engagement with the upper portion of a pack body 4 and a spinneret plate holder 18, carrying a spinneret plate 6 and a distributor plate 7 separated by a 0.003″ spacer disc 8, is in screw-threading engagement with the lower portion of the said pack body. The pack body 4 is sealed from the cover 1 by gasket 21 and from the distributor plate 7 by U-shaped gasket 20. A gauze 5, its extremities sealed by the U-shaped gasket 20, is provided over the surface of the distributor plate to support a filtering medium, such as sand, contained within the pack body.

The top of the distributor plate 7 contains a divided channel system 9 and an unchanneled dividing section 10 which is arranged to lie at right angles to the line joining the polymer entry ports 2 and 3 to the pack. Each half of the channel system 9 is connected by ports 11 to a series of parallel channels 12 in the underside of the plate. The ports 11 are arranged so that alternate channels 12 are connected to each half of the channel system 9. The top of the spinneret plate 6 contains a series of parallel channels 13 which lie between the channels 12 of the distributor plate 7 or are narrower than the septa 14 dividing the channels 12 thus leaving restricted gaps 15 between the spinneret plate and the distributor plate on either side of the channels 13. The depth of the gap 15 is governed by the thickness of the spacer disc 8 and is thus 0.003 inch. Extrusion orifices 16 are located in the bottom of counter bores 17 which are formed on the centre line of channels 13.

In the spinning of side-by-side heterofilaments from polymers having substantially the same melt viscosities through the apparatus described above, the component polymers in the molten state are fed from meter pumps (not shown) to the polymer ducts 2 and 3 of cover 1. The polymers meet below the cover to form a liquid interface and pass through the filtering medium and the gauze 5 without mixing. Having passed through the gauze 5 the polymers flow into the divided channel system 9, one polymer to each side, in the top of the distributor plate 7 and thence via ducts 11 into alternate channels 12 in the underside of the said distributor plate. The polymers then pass from the relatively unconstricted zones of the channels 12 through the restricted zones formed by the gaps 15 and then into the relatively unconstricted zone of the channels 13 in the spinneret plate 6. The restricted zones formed by the gaps 15 maintain the pressure in the channels 12 at a higher level than that in the channels 13 and thereby reduce the tendency of polymer in the channels 12 to flow from them into the channels 13 and on into the next channel. Thus the tendency for uncontrolled mixing of the polymers between the distributor plate 7 and the spinneret plate 6 is reduced and a substantially straight interface is formed in the channels 13. The polymers are finally extruded through orifices 16 via the counter bores 17 in the form of uniform side-by-side heterofilaments.

In order to ensure that uncontrolled mixing of the molten polymer components between the distributor plate and the spinneret plate 6 is avoided, the gap 15 should be within defined limits, the limits depending on the dimensions of the extrusion orifices and the melt viscosities of polymers employed. Thus it should not be greater than 0.003 inch with extrusion orifices of 0.015" diameter and polymers having a melt viscosity of 300 to 500 poises. A larger gap may be tolerated with larger diameter orifices and higher melt viscosity polymers.

The channels 13 in the spinneret plate 6 are necessary to ensure that a substantially straight polymer interface is maintained above the spinneret holes 16, and thus allow the formation of heterofilaments which are uniform in respect of their composition.

The ports 11 are preferably arranged as shown in the FIGURES I and II to feed polymer into the channels 12 along a line perpendicular to those channels to ensure that at opposite points in any two adjacent channels the pressures will be equal.

Since the polymers are fed to channels 12 from a single source, i.e. feed ports 11, the pressure along the channels diminishes to some extent towards the ends thereof and as a result the denier of the filaments extruded from each row of orifices also tends to decrease. This can be avoided by making the annular spacer disc 8 in the form of an overall disc containing slots which are perpendicular to and connect each channel 12 with one adjacent channel 13. The width of the slot then controls the denier of the corresponding filament.

FIGURES IV to VII relate to an alternative design of spinneret assembly comprising modified distributor and spinneret plates. The upper face 31 of the distributor plate 30 (FIGURES IV and V) is recessed and contains channel systems 32 and 33 to direct molten polymers from each side of the spinneret plate to rows of polymer ports 34 and 35, which are angled through the distributor plate, as shown in FIGURE V, to form a single row of holes on the underside of the plate. A recessed shoulder 36 is formed on the underside of the plate. The spinneret plate 40 has a raised shoulder 42 on the upper face 41 thereof which cooperates with the recessed shoulder 36 of the distributor plate. The upper face carries two series of parallel channels, polymer channels 43 and orifice channels 44 having in the base thereof orifices 45. The polymer channels 43 are spaced on either side of the orifice channels 44 and are arranged to be perpendicular to the line of polymer ports 35 and 36. The depth of the shoulders 36 and 42 in the distributor and spinneret plates are machined to give the required gap between the upper face of the spinneret plate and the lower face of the distributor plate when the plates are in cooperation with each other. In this arrangement the portions 46 of the spinneret plate between the orifice channels and polymer channels provide restricted zones between the said channels equivalent to gap 15 of FIGURE II. In an alternative arrangement the depth of the shoulders 36 and 42 may be the same and the dimensions of the gap and restricted zones 47 determined by a spacer disc similar to that described with reference to FIGURES II and III.

When using the above-mentioned assembly for the manufacture of side-by-side heterofilaments in co-operation with the cover 1, the pack 4, the spinneret plate holder 18 and ancillary gaskets etc. of FIGURE II, molten polymers pass into the polymer ports in the distributor plate in the manner described with reference to the arrangement depicted in the aforementioned FIGURE II. The two molten polymers issue through alternating ports in the lower face of the distributor plate and pass into the corresponding alternate polymer channels in the spinneret plate. The polymers then pass from the relatively unconstricted zones of the polymer channels through the restricted zones 47, formed between the portions 46 of the spinneret plate and the lower face of the distributor plate, into the relatively unconstricted zones of the orifice channels. Two polymers entering each channel from opposite sides and meet to form an interface above the orifice through which they are extruded in the form of side-by-side heterofilaments.

In the embodiments described above the molten polymer components of the heterofilaments are filtered through an undivided filter pack; the use of such a pack in the production of heterofilaments is described in our co-pending U.S. application Ser. No. 297,305. It is preferable, when using an undivided filter pack, that the component polymers have the same, or nearly the same melt viscosities. If the melt viscosities of the polymer components differ the interface formed between the components in the filter pack will tend to move across the pack in the direction of the polymer having the lowest viscosity. In these circumstances the channel systems and the polymer ports in the distributor plate would have to be redesigned to accommodate this movement to maintain the alternate feed to the polymer channels.

In such circumstances the need for redesigning the distributor plate may, of course, be avoided by fitting a dividing septum within the pack body 4 to keep the polymer component separate until they reach the distributor plate.

Example

Using the apparatus described with particular reference to FIGURE II, polyhexamethylene adipamide and an 80/20 copolymer of polyhexamethylene adipamide/poly-epsilon caprolactam, both containing 0.2% $T_1O_2$ and having melt viscosities of about 450 poises at 290° C., were melted in separate melters at 290° C. and the molten polymers metered at equal rates of flow into the ports 2 and 3 of the apparatus in FIGURE II.

The polymers were extruded into side-by-side heterofilaments through a 60-hole spinneret at a spinning temperature of 290° C., cooled by a transverse blast of air, passed through a steam conditioning tube and wound up at 1068 ft./min. to give a yarn having a spun denier of 1400. 120 packages of the as-spun yarn were formed into a tow and draw crimped at a draw ratio of 4.5 using a stuffer-box. The resulting tow had filament denier of 6.6, a filament extensibility of 49.6%, a tenacity of 4.0 g./d. and a crimp frequency of 9.7.

Although the above description refers to spinneret and distributor plates in which the channels and orifices are in the form of straight lines they can equally well be in the form of concentric lines, or in any other desired arrangement.

The spinneret orifices may be circular in cross-section or they may be non-circular, e.g. they may be slot or Y-shaped.

What I claim is:

1. A spinneret assembly for the manufacture of side-by-side heterofilaments comprising a distributor plate and a spinneret plate containing a plurality of extrusion orifices adapted to provide a space between the lower face of the distributor plate and the upper face of the spinneret plate, channel means associated with said distribution plate and with said spinneret plate defining a series of first alternate relatively unconstricted zones located on either side of a series of second relatively unconstricted zones and further defining constricted zones which separate said first and second relatively unconstricted zones in the direction of polymer flow, means in the distributor plate for directing two different viscous liquid polymer components into said first relatively unconstricted zones, the extrusion orifices contained in the spinneret plate co-operating with the second mentioned relatively unconstricted zones.

2. A spinneret assembly according to claim 1 wherein one dimension of the constricted zones is determined by a spacer plate located between the distributor plate and the spinneret plate.

3. A spinneret assembly according to claim 2 wherein the first mentioned relatively unconstricted zones are formed by channels in the lower face of the distributor plate, alternate channels communicating with opposite portions of the upper face thereof, the second mentioned relatively unconstricted zones are formed by channels in the upper face of the spinneret plate in which channels are located the spinneret orifices, and the constricted zones are formed by the space between the unchannelled portions of the lower face of the distributor and the unchannelled portions of the upper face of the spinneret plate.

4. A spinneret assembly according to claim 2 wherein the first and second mentioned unconstricted zones are formed by channels in the upper face of the spinneret plate the spinneret orifices being located in the channels forming the second mentioned relatively unconstricted zones and the constricted zones are formed by the unchannelled portions of the upper face of the spinneret plate and the lower face of the distributor plate.

5. A spinneret assembly according to claim 2 wherein the first and second mentioned unconstricted zones are formed by channels in the lower face of the distributor plate, the spinneret orifices contained in the spinneret plate being aligned with the channels forming the second mentioned relatively unconstricted zones, and the constricted zones formed by the unchannelled portion of the lower face of the distributor plate and the upper face of the spinneret plate.

6. A spinneret assembly according to claim 1 wherein the channels forming the first and second mentioned relatively unconstricted zones are formed in a spacer plate located between the distributor plate and the spinneret plate which plate also determines one dimension of the constricted zones.

7. A spinneret assembly according to claim 1 wherein the dimension of the constricted zone determined by the space between the spinneret plate and the distributor plate does not exceed 0.003 inch for spinneret plates having orifices of about 0.015 inch.

References Cited
UNITED STATES PATENTS

| | | |
|---|---|---|
| 2,871,511 | 2/1959 | Speakman. |
| 2,971,219 | 2/1961 | Hill. |
| 2,386,173 | 10/1945 | Kulp et al. |
| 2,815,532 | 12/1957 | Brownlich. |
| 3,006,028 | 10/1961 | Calhoun. |
| 3,209,402 | 10/1965 | Riley et al. |
| 3,217,734 | 11/1965 | Fitzgerald. |
| 3,224,041 | 12/1965 | Reynolds. |
| 3,237,245 | 3/1966 | Nonami et al. |
| 3,289,249 | 11/1966 | Nakoyama et al. |
| 3,225,383 | 12/1965 | Cobb. |
| 3,295,552 | 1/1967 | Powell et al. _____ 264—171 X |
| 3,318,987 | 5/1967 | Fitzgerald _____ 264—168 X |

JULIUS FROME, Primary Examiner

J. H. WOO, Assistant Examiner

U.S. Cl. X.R.

264—171